(12) United States Patent
Gradischnig

(10) Patent No.: US 6,690,787 B1
(45) Date of Patent: Feb. 10, 2004

(54) APPARATUS AND METHOD FOR SELECTING A SIGNALLING LINK

(75) Inventor: Klaus Gradischnig, Gauting (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/509,274

(22) PCT Filed: Nov. 9, 1998

(86) PCT No.: PCT/EP98/07146

§ 371 (c)(1),
(2), (4) Date: Mar. 27, 2000

(87) PCT Pub. No.: WO99/25128

PCT Pub. Date: May 20, 1999

(30) Foreign Application Priority Data

Nov. 10, 1997 (DE) .......................................... 97119662

(51) Int. Cl.⁷ .............................................. H04M 7/00
(52) U.S. Cl. .................. 379/229; 379/230; 379/220.01; 379/221.01
(58) Field of Search ................. 379/229, 230, 379/231, 234, 220.01, 221.01

(56) References Cited

U.S. PATENT DOCUMENTS

| 5,029,165 A | | 7/1991 | Choi et al. | |
|---|---|---|---|---|
| 5,084,816 A | * | 1/1992 | Boese et al. | 395/575 |
| 5,592,530 A | * | 1/1997 | Brockman et al. | 379/34 |
| 5,650,998 A | * | 7/1997 | Angenot et al. | 370/225 |
| 5,896,377 A | * | 4/1999 | Boot et al. | 370/352 |
| 5,912,628 A | * | 6/1999 | Jeong | 379/221 |
| 5,953,404 A | * | 9/1999 | Fikis et al. | 379/230 |
| 6,002,693 A | * | 12/1999 | Hahn | 370/466 |
| 6,038,218 A | * | 3/2000 | Otsuka et al. | 379/230 |
| 6,078,584 A | * | 6/2000 | Mottishaw et al. | 379/230 |
| 6,314,102 B1 | * | 11/2001 | Czerwiec et al. | 370/95 |

FOREIGN PATENT DOCUMENTS

| EP | 0 681 405 | 8/1995 |
|---|---|---|
| WO | WO 97/11563 | 3/1997 |

\* cited by examiner

*Primary Examiner*—William J. Deane, Jr.
(74) *Attorney, Agent, or Firm*—McCormick, Paulding & Huber LLP

(57) ABSTRACT

A method and apparatus in which specific properties of individual signalling links in a signalling network are utilized without all signalling link sets having to have these specific properties. A fixed allocation is provided between a signalling link having the specific properties and a specific value of the signalling a signalling message.

10 Claims, 4 Drawing Sheets

Link 1 between X and Y has failed
SLS assignment updated

Interworking of long SCCP messages between broadband and narrowband

Protocol levels and message flow from
A via X to Y after outage of the link 1
from X to Y

APPARATUS AND METHOD FOR SELECTING A SIGNALLING LINK

BACKGROUND OF THE INVENTION

The present invention is a signalling point in a telecommunications signalling network such as International Telecommunications Union's (ITU) Signalling System No. 7 (SS7). SS7 is a means by which elements of a telephone network exchange information such as where to route a telephone call. In SS7 or its regional and national versions (such as, for example, ETSI ETS 300 008, ANSI T 1. 111, Deutsche Telekom 163TR72), the signalling links that connect two signalling points are normally combined to form signalling link sets. A signalling message (MSU) contains routing and switching information for a telephone call. The MSU has a signalling link selection field which contains data directing the message to a specific link in the link set.

The SS7 protocol features a Message Transfer Part (MTP). The MTP is responsible for the transmission of the signalling messages and thereby assures that signalling messages having an identical signalling link selection field normally take the same route through the signalling network, i.e. cannot overtake one another (see, for example, ITU recommendations Q. 701 through Q. 706). This occurs in that signalling messages with a specific value in the signalling link selection field (SLS or SLS value) are always sent to a specific destination by the MTP via the same signalling link in a given signalling link set, i.e., there is normally a signalling link set-related (or at least destination-related), fixed allocation between the SLS value of a message and a signalling link of a signalling link set.

A departure from this fixed allocation is undertaken when an outage of a signalling link (or of a signalling link set) occurs. In this case, the signalling messages are sent via alternate signalling links or alternate signalling link sets. When one or more down signalling links become available again, what is otherwise the fixed allocation between the SLS values and the signalling link to be employed for such signalling messages can be modified (see Q. 704, §4.2.2). I.e., the fixed allocation of signalling link selection field to a specific signalling link of the signalling link set can now be different than the pre-outage allocation.

Further information about the selection of a specific signalling link set and a specific signalling link on the basis of the SLS value in the signalling link selection field can be found, for example, in Q. 704 and Q. 705. It specifically follows therefrom that this allocation is in fact subject to certain principles (one, for example, is that an optimally uniform workload on the signalling link is desirable), but is otherwise independent of the selection criteria of other signalling points in the individual signalling points.

It can thus not be currently assumed in a signalling network that a message having a specific value in the signalling link selection field takes a specific, previously defined signalling link in every signalling link set used on its signalling path (although a sender can assume that its messages having the same SLS take the same route, it can nonetheless not normally know that, for example, a message having SLS=1 is sent over the link=1 in every link set, since the allocation of the SLS values to the links can occur autonomously in every node. Further, examples can be recited wherein, following an outage of links, it is not possible to achieve the original allocation of SLS value to link without "additional", actually superfluous redistribution of the SLS values. This is also the reason for the comment in Q. 704, §4.2.2 that a "modified" fixed allocation is then possible.

It is thus not possible for a user and the MTP (of the central signalling method No. 7) to usefully apply specific properties of individual signalling links that proceed beyond the generally existing properties of the signalling links in a signalling network. Let the transmission capacity of a signalling link serve as an example of such a property. If there were a signalling link in a signalling link set that had a significantly higher transmission capacity than the other signalling links, then this could not be exploited because of the general concept of the (optimally) equal distribution of the signalling traffic over all signalling links of the signalling link set. If the signalling link set were loaded with so much traffic that the signalling link having the high transmission capacity also carried correspondingly more traffic, the other signalling links in the signalling link set would be overloaded because of the method used by the MTP for achieving an equal distribution. Operating a signalling link set with signalling links having different properties thus makes little sense.

SUMMARY OF THE INVENTION

It is an object of the invention to specify a signalling point or, a method with which a utilization of the specific properties of individual signalling links in a signalling network becomes possible without all signalling link sets having to have these specific properties.

This object is achieved by a method and apparatus wherein for handling signalling messages that sequences in a signalling point of a signalling network with a message transfer part according to central signalling system number 7, with a message transfer part of the signalling point using a signalling link selection field of a message to be forwarded for allocating the message to a specific signalling link within a signalling link set. Given at least one value of the signalling link selection field, prescribing a signalling link of the signalling link set to which the message transfer part must allocate a message having this value of the signalling link selection field for the message transfer part based on a type of the signalling link, respectively, a method according to claim 6.

Referring to FIGS. 3 and 4, the invention is explained in greater detail below on the basis of the specific example of the utilization of signalling links based on ITU recommendations Q. 2210, Q. 2240 and Q. 2110 in a network otherwise based on Q. 701 through Q. 706, for the specific concerns of the signalling connection control part (SCCP), see, for example, Q. 701 through Q. 715. It is thereby assumed that, there will be signals exchanged between broad band and narrow band networks in which signalling link sets in the network have both S-AAL signalling links according to Q. 2110 and Q. 2140 as well as those according to MTP level 2 (Q. 703).

The SCCP addresses software applications within a signalling point. The SCCP is especially selected as an example because it is the predestined beneficiary of such expanded properties of signalling links (longer maximum message length, high transmission capacity).

Two points are to be noted in order to enable this use of high-performance signalling links and exploit their properties:

1. When the expanded capacity is also available in a signalling link set, the traffic intended for it should also be routed over the corresponding signalling link.
2. If an outage of the signalling link(s) offering the expanded capacity occurs, it must be potentially assured that the traffic can fundamentally continue to be handled—even with certain limitations of a quantitative nature under certain circumstances—or, on the other hand, can be supplied to a defined error handling.

A way of resolving these points is explained below with reference to FIGS. 1 through 4.

DESCRIPTION OF THE PREFERRED EMBODIMENTS

Figure 1:
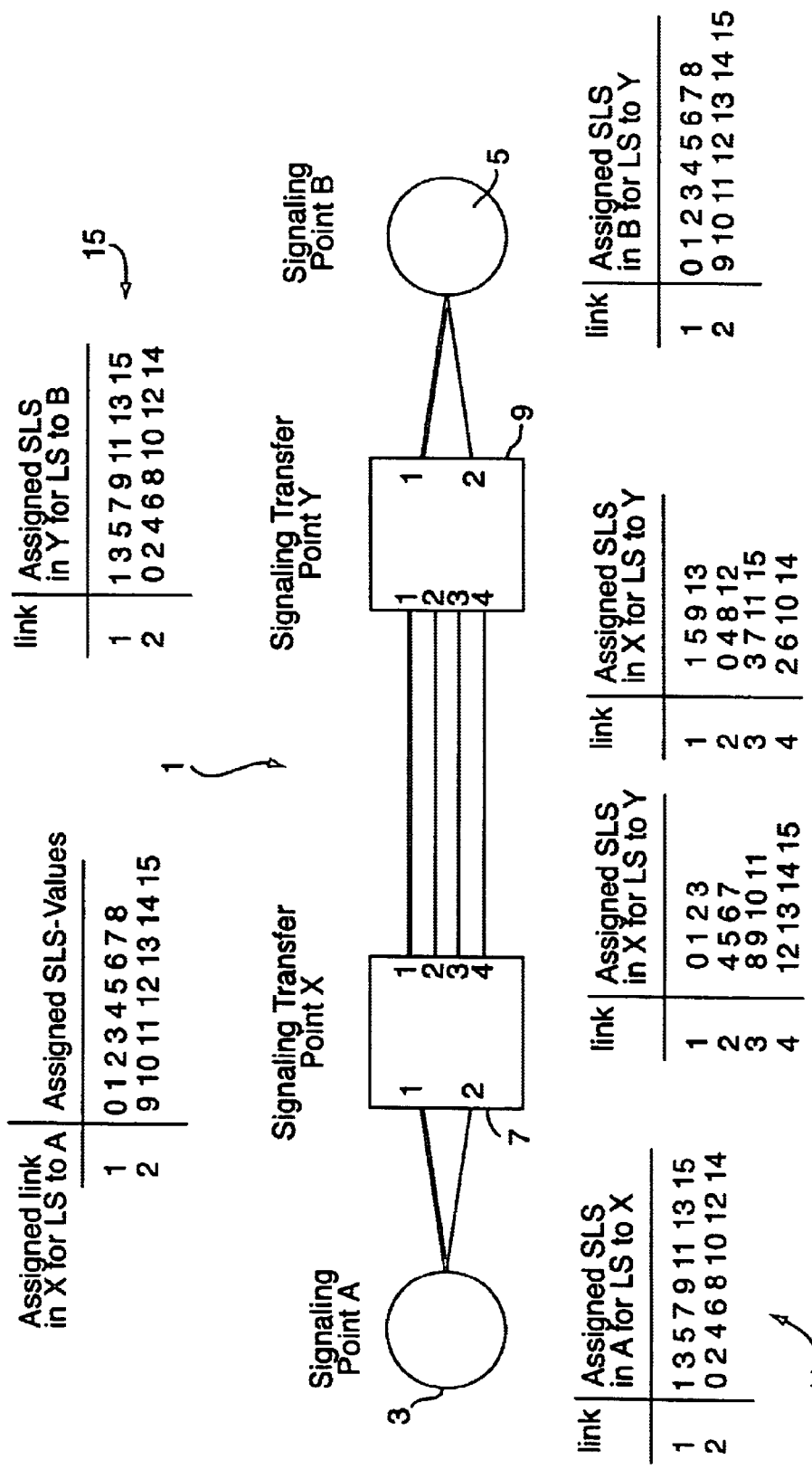
FIG. 1 illustrates in block diagram format a network portion according to the invention with connected signalling points.

FIG. 1 shows a portion of a network 1 (further nodes and signalling links have not been shown) in which two signalling points (A and B) 3, 5 are connected to one another via two signalling transfer points (X and Y) 7, 9. FIG. 1 further shows possible allocation tables 11, 13, 15 that allocate SLS values to the individual signalling links (link) of the signalling link set (LS). Referring to the allocation table for the link set between Signal Transfer Points X and Y 13, one can see that the 16 SLS values within the LS are uniformly distributed onto the links, with 4 SLS values per link. However, one can also see that the allocation of SLS values changes between signalling points. For example on the link from A to B, a message having SLS=2 uses link 2 in the LS from A to X, link 1 in the LS from X to Y 13, and again uses link 2 from Y to B 15. In each of the illustrated LS, further, the link with number 1 should be a link distinguished by special capacity.

Figure 2:
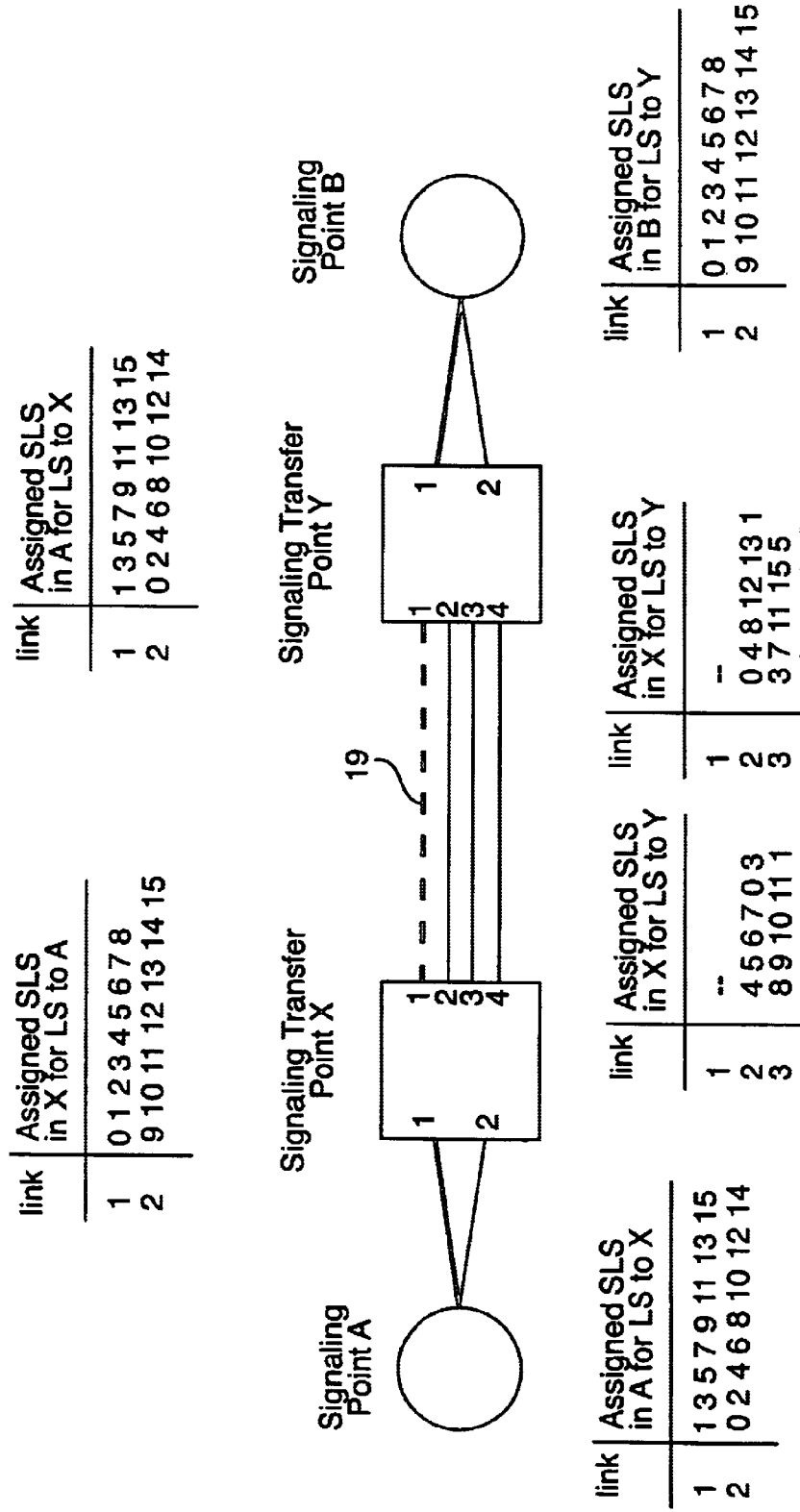
FIG. 2 shows the network portion of FIG. 1 where a link with increased capacity has failed.

As shown in FIG. 2, when an outage in a link occurs 19, here link 1, SLS values are redistributed. SLS values allocated to link 1 between Points X and Y are re-allocated to the remaining functional links 2–4. Referring to the allocation tables of FIGS. 1 and 2, one can see that in the absence of an outage a message with an SLS value of 1 would take link 1 between X and Y 13, however, after an outage, the same message would travel along link 3 between X and Y 31.

A preferred embodiment of the present invention ensures that the appropriate messages are routed to links with enhanced properties. To accomplish this, the signalling links that make this expanded capacity available have the same SLS values, for example the value 1, allocated to them in the entire signalling network in every signalling link set in which they are employed. The allocation of SLS values occurs upon commissioning of the signalling link with the expanded capacity, either via a central administration center or, on the other hand, by individual administration in the nodes affected.

Additionally, a preferred embodiment of the invention limits the message transfer part such that it keeps the allocation between signalling link and the SLS value of the signalling link selection field constant during normal operation (i.e. no outage of this specific signalling link) or, respectively, at least re-allocates the excellent values of the signalling link selection field to it after outage and re-initialization of this specific signalling link.

Further, in a preferred embodiment of the invention, the SCCP (see Q. 711 through Q. 715) of the message transfer part is expanded to the effect that it correspondingly selects the SLS value for signalling message streams that can benefit from the expanded capacity link. The SCCP utilizes allocation data stored in a central administration center or in individual administration centers in the appertaining nodes.

FIG. 2 shows a situation wherein the link with the increased capacity, link 1, 19 (for example, according to Q. 2110 and Q. 2140) has failed between X and Y. A message that requires this enhanced capacity, for example due to its length, can no longer be transmitted between X and Y.

Figure 3:
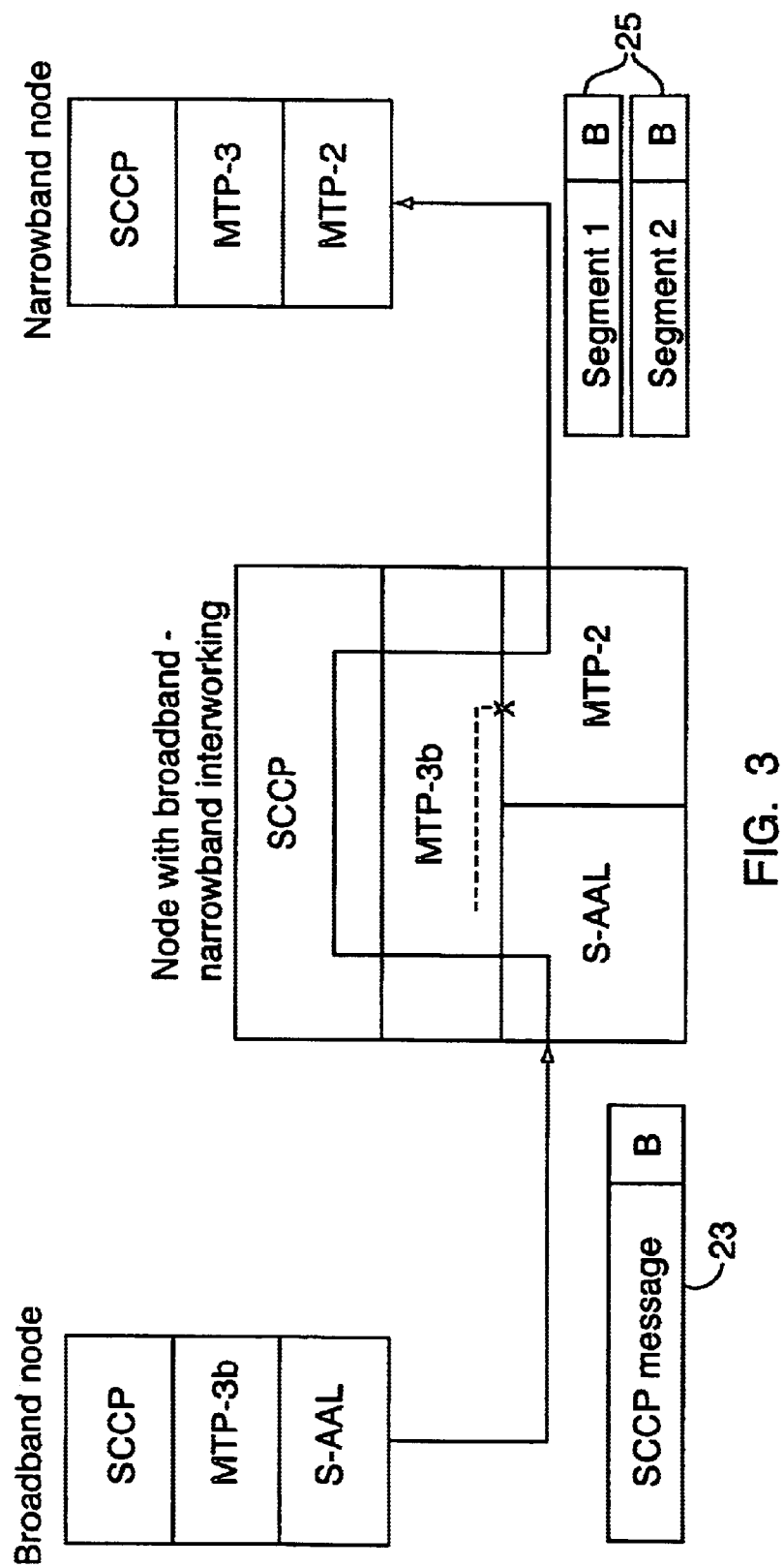
FIG. 3 is a diagram illustrating the local SSP segmenting a message so that it can be transmitted over a narrow band network.
Figure 4:
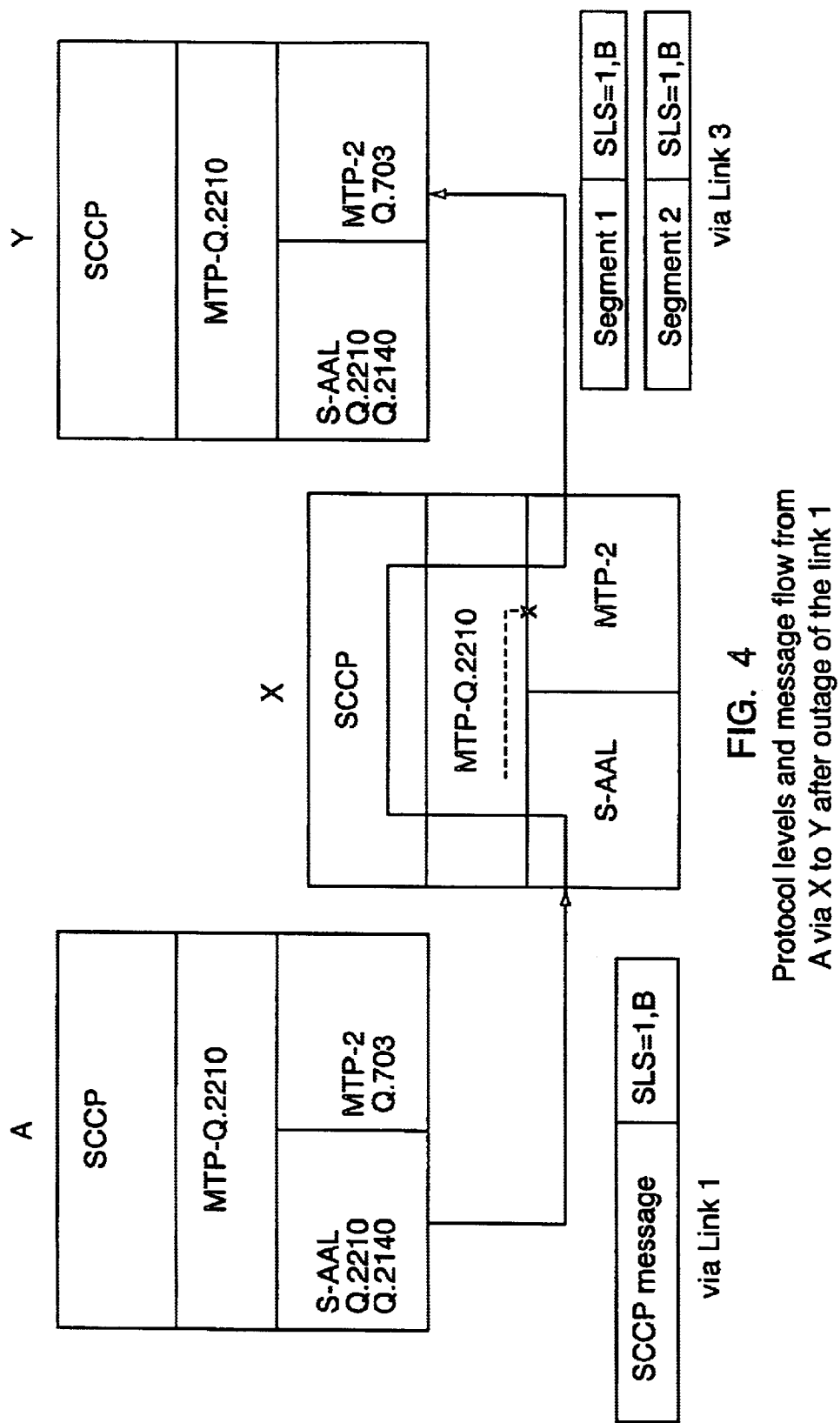
FIG. 4 is a diagram illustrating a local user reshaping the message so that it can also be transmitted with existing possibilities.

If no solution is required for this problem because, for instance, one wishes to forego burdening the network with the specific traffic in this case, affected signalling messages can be simply discarded. Otherwise, the role of the SCCP in addressing signalling problems between broadband and narrowband signalling network (parts) can be expanded to address the present problem. This known solution functions such that, when the MTP in a node that handles the interworking between broadband and narrowband networks recognizes a message of the SCCP that cannot be transmitted over the narrowband network, it delivers it to the local SCCP even though this message is intended for a different signalling point. FIGS. 3 and 4, show the components of narrowband and broadband networks and the interaction thereof.

After receiving the undelivered message, the local SCCP then has the possibility of correspondingly segmenting this message, so that it can also be transmitted over the narrowband network. This is shown in FIG. 3 where the SCCP message 23 is divided into Segments 1 and 2 25.

In a preferred embodiment of the present invention, this method is expanded to the effect that, when the MTP recognizes a message that requires the expanded capacity without a corresponding signalling link being available, it delivers it to the locally affected user of the MTP, generally the SCCP, even though this message is destined for a different signalling point.

The local user then has the possibility of correspondingly reshaping this message so that it can also be transmitted with the existing possibilities (see FIG. 4). Said reshaping by the SCCP can, for example, be a segmenting of a message that is too long.

In another embodiment of the invention, the local user could also initiate an error handling. For example, the SCCP could implement the "return on error" procedure (i.e., return an (L)UDT service message (L)UDTS) to the source of the message) (see, for example, Q. 711 through Q. 715).

Although various minor changes and modifications might be proposed by those skilled in the art, it will be understood that my wish is to include within the claims of the patent warranted hereon all such changes and modifications as reasonably come within my contribution to the art.

What is claimed is:

1. A signaling point of a signaling network, comprising:
    a message transfer part according to a signaling system, wherein the message transfer part of the signaling point uses a signaling link selection field of a message to be forwarded for allocating said message to a specific signaling link within a signaling link set;
    given at least one value of the signaling link selection field, the signaling link set to which said message transfer part must allocate said message having said value is prescribed for the message transfer part based on a specific property of the signaling link; and wherein a user, given specific messages, causes said messages to be routed network-wide over a desired type of signaling link by supplying the signaling link selection field of said specified messages with the value prescribed for this type.

2. The signalling point according to claim 1, wherein the signalling point undertakes said prescription upon commissioning or following a recommissioning of the signalling link's specific properties.

3. The signalling point according to claim 1 wherein the message transfer part delivers a signalling message that, on the basis of its signalling link selection field, it would have to forward onto a signalling link having said specific properties to a local entity of the user for further processing when the value of its signalling link selection field does not identify a corresponding signalling link at the time.

4. The signalling point according to claim 3 wherein the local entity of the user alters a message received from the message transfer part due to nondeliverability and returns it to the message transfer part for forwarding.

5. The signalling point according to claim 3 wherein the local entity of the user initiates an error handling when it receives an undeliverable message from the message transfer part.

6. A method for handling signalling messages that sequence in a signalling point with a message transfer part according to a signalling system, comprising the steps of:

utilizing a signalling link selection field of a message to be forwarded for allocating said message to a specific signalling link within a signalling link set;

selecting a signalling link of the signalling link set for the message transfer part based on a specific property of said signalling link; and allocating said message having said value of the signalling link selection field to a signalling link having a specific property.

7. The method according to claim 6 wherein said prescription is undertaken upon commissioning or after outage and recommissioning of the signalling link having said specific properties.

8. The method according to claim 6 wherein a signalling message that, on the basis of a value of its signalling link selection field, would have to be forwarded onto a signalling link having said specific properties, is delivered to a local entity of a user for further processing when a corresponding signalling link cannot be identified on the basis of the value of its signalling link selection field at the time.

9. The method according to claim 8 wherein a message received from the message transfer part due to non-deliverability is reshaped by the local entity of the user and is returned to the message transfer part for forwarding.

10. The method according to claim 6 wherein a local entity of the user initiates an error handling when it receives an undeliverable message from the message transfer part.

* * * * *